Н3,475,356
SOLVENT RESISTANT CROSS-LINKED POLYMERS DERIVED FROM CELLULOSE ESTERS
John H. Davis and Charles H. Coney, Kingsport, Tenn., assignors to Eastman Kodak Company, Rochester, N.Y., a corporation of New Jersey
No Drawing. Filed Jan. 27, 1966, Ser. No. 523,270
Int. Cl. C08g *41/04, 45/00*
U.S. Cl. 260—13                                  7 Claims

ABSTRACT OF THE DISCLOSURE

Solvent resistant cross-linked polymers are prepared by reacting certain cellulose derivatives and certain linear saturated polymers with various saturated organic diisocyanates. Examples of useful cellulose derivatives include cellulose esters having 0.05 to 10% by weight hydroxyl group. Useful linear polymers include polyesters having a hydroxyl number from 10 to 500, polyalkylene glycols having a molecular weight of 120 to 6000, an epoxy resin having an epoxide equivalent of 100 to 1000, a polyalkyl acrylate or methacrylate having at least 2% carboxyl content, or a butylated ureaformaldehyde resin.

---

This invention relates to novel solvent resistant cross-linked polymers derived from cellulose derivatives and various linear saturated synthetic polymers capable of cross-linking to high molecular weight materials by the use of various organic diisocyanates as cross-linking agents, and more particularly to cross-linked polymers derived in the above manner from hydroxyl group containing cellulose esters and synthetic polymers, and to various shaped articles prepared therefrom.

It is well known in the art that organic diisocyanates will react with an active hydrogen such as the hydroxyl group of a polyester, polyether, epoxy resin, cellulose, etc. to give cross-linked polymeric compounds. Many articles have been published describing the diisocyanate reactions in the preparation of polyurethane films and foamed materials. Also it has been suggested to employ amounts not exceeding 1–2% of cellulose acetate butyrate or cellulose acetate propionate as flow control agents in coating compositions comprising a polyester cross-linked with an organic diisocyanate. However, aside from the improved flow control, such low cellulose ester content compositions do not give coatings measurably different from those obtained with similar compositions containing no cellulose ester. While polymeric materials such as above and generally similar materials have been proposed for a variety of uses, they have not been found entirely satisfactory in many commercial applications because of certain serious shortcomings. For example, dry films or coatings obtained from the application of liquid coating compositions employing polyesters and diisocyanates as the principal film-forming materials are known to have good hardness, toughness, flexibility, mar resistance and gloss, but unfortunately they are slow drying, have poor wetting properties and tend to crater, fish eye and sag on application. In the case of cellulose esters, for example, it has been found that when an organic diisocyanate compound is added, for instance to cellulose acetate butyrate and then is cured, the resulting film has only moderate toughness and elongation, and less than desirable solvent resistance.

We have now made the important discovery that a valuable new class of solvent resistant cross-linked polymers can be derived by cross-linking (a) cellulose derivatives containing an active hydrogen or site, such as hydroxyl groups with (b) various linear saturated synthetic polymers that likewise contain an active hydrogen or site, such as hydroxyl and carboxyl groups, using various saturated organic diisocyanates as cross-linking agents. The cross-linked polymeric products obtained have a wide range of physical properties, depending upon the type and amount of synthetic polymer used. They are film-forming materials that by coating from suitable compositions thereof, give films which on curing vary from tough and flexible to hard and brittle films, and which are all characterized by smooth glossy surfaces free of any imperfections and high resistance to common solvents. For example, films produced from polymers of the invention wherein the synthetic polymer is solely an epoxy, acrylic or ureaformaldehyde resin are hard and brittle, while the films produced with branched-chain polyesters, mixtures of polyesters with minor proportions of epoxy resins, polyethylene glycols and polypropylene glycols are particularly outstanding in toughness, tensile strength and resistance to solvents. Those prepared with polyesters of relatively low hydroxyl content have, in addition, considerably higher elongation values. Thus, for example, such high elongation films are unmatched by even a highly plasticized cellulose acetate butyrate film. Generally, cellulose acetate butyrate films containing 25–30 percent by weight of plasticizer have an elongation of about 40–50 percent. In contrast, cross-linked cellulose acetate butyrate and linear saturated polyester resins (hydroxyl number of 50 or less) films of the invention have elongation values of over 300 percent, as well as greatly increased film toughness and tensile strength and superior solvent resistance as compared with conventional plasticized cellulose acetate butyrate films. In this connection, we have found further that the higher the hydroxyl number of the polyester resin, the greater is the degree of cross-linking possible. Also, that the greatest tensile strength and solvent resistance is obtained with the polyester resins having the highest hydroxyl numbers. The materials that can be satisfactorily coated with the compositions of the invention include glass, metal, wood, copper wire, polyethylene bowling pins, rubber, leather, and the like.

It is, accordingly, an object of the invention to provide novel and improved cross-linked cellulosic type polymers comprising one or more hydroxyl group containing cellulose derivatives cross-linked with one or more linear saturated synthetic polymers having active hydrogen or sites. Another object is to provide polymers such as above wherein a hydroxyl group containing mixed cellulose ester such as cellulose acetate butyrate or cellulose acetate propionate is cross-linked with a saturated synthetic polymer having active hydrogen or sites such as a polyester, a polyethylene glycol, a polypropylene glycol, a polyalkyl acrylate or methacrylate, an epoxy resin or a ureaformaldehyde resin. Another object is to provide liquid compositions comprising the above-mentioned components that are capable of being formed and cured into solvent resistant cross-linked shaped articles. Another object is to provide a process for preparing the above cross-linked materials. ther objects will become apparent from the description and examples.

In accordance with the invention, we prepare our novel solvent resistant cross-linked polymers by reacting a mixture of (a) cellulose derivatives containing an active hydrogen or site, such as hydroxyl groups, (b) a linear saturated synthetic polymer containing an active hydrogen or site, such as hydroxyl or carboxyl groups, and (c)

a saturated organic diisocyanate. The proportions of components (a) and (b) can be varied widely since any amounts are operable in the process of the invention, but preferably the mounts are varied about from 15–90% by weight of component (a) and from 85–10% by weight of component (b). When (a) is a cellulose ester and (b) is a polyester or a polyehylene or polypropylene glycol, the ratio of (a)/(b) on a hydroxyl basis is preferably about from 1/1 to 5/1. The proportions used of the organic diisocyanate component is dependent upon the total hydroxyl content of components (a) and (b) and the degree of cros-linking desired, but preferably up to about 25% in excess of the stoichiometrically calculated amount required to react with all of the available hydroxyl, carboxyl, etc. groups is employed. The particular organic diisocyanate used in the reaction is not critical since it functions primarily to form the cross-links between the cellulose molecules and the synthetic polymer chains. The reaction is carried out at a temperature of about 75–250° C., and preferably at 150–250° C. to obtain complete reaction in about 10–50 minutes. Pressures greater than normal atmospheric pressure can be used, if desired. Advantageously, the reaction is carried out in an inert liquid medium which is a solvent for the reactants, for example, in one or more common solvents such as benzene, toluene, methyl acetate, ethyl acetate, butyl acetate, methyl ethyl ketone, methyl isobutyl ketone, cellosolve acetate, and the like. Such reaction mixtures can be used for direct coating into films or as coatings on shaped objects, or as spinning solutions for fibers with certain of the tougher polymers, followed by curing at appropriate temperatures such as above indicated. The cross-linked polymeric products of the invention produced in accordance with the above process wherein the cellulose derivative is a hydroxyl group containing mixed cellulose ester, and more particularly a hydroxyl group containing cellulose acetate butyrate, wherein the synthetic polymer cross-linked with the said ester is preferably a linear saturated branched-chain polyester (i.e., containing hydroxyl groups in the side chains), of an alkanediol or a mixture of an alkanediol and an alkanetriol and an alkanedioic acid, and wherein the organic diisocyanate is an alkane diisocyanate give films, photographic film supports, coatings and fibers that have especially desirable physical properties, and are the preferred species of the invention. The proportions of the cellulose mixed ester and the polyester employed for preparing the preferred cross-linked polymers range preferably from 30–90% by weight of the cellulose mixed ester and from 70–10% by weight of the polyester.

Suitable cellulose derivatives for practicing the invention include any of the conventional organic esters of cellulose with one or more alkanoic acids or alkyl ethers of cellulose, e.g., cellulose acetate, cellulose propionate, cellulose acetate butyrate, cellulose acetate propionate, ethyl cellulose, etc., cellulose nitrate, and the like, that contain about from 0.05 to 10% by weight of hydroxyl groups. The molecular weight of the cellulose derivative is not critical since by suitable adjustment of the concentration in which used, even relatively high molecular weight members are operable in the invention. The cellulose literature is replete with methods for preparing cellulose derivatives of the above kind. For example, the preparation of cellulose acetate butyrates of varying molecular weights and hydroxyl contents is described in a booklet entitled "Cellulose Acetate Butyrate," 2nd edition, published by Eastman Chemical Products, Inc.

Suitable linear saturated branched-chain polyesters for use in the practice of the invention include any of those commercially available that are produced from saturated aliphatic, aromatic or cycloaliphatic polyols and dibasic acids, and that have hydroxyl numbers ranging about from 10 to 500. The molecular weight of the polyester is not critical since by adjustment of the concentration in which used even high molecular weight numbers are operable in the invention. However, the preferred polyesters of hydroxyl numbers about from 10 to 500 and molecular weights of about 500–5,000 or more are produced from alkanediols and mixture of alkanediols with alkanetriols having from 2 to 10 carbon atoms, e.g., ethylene glycol, trimethylene glycol, hexamethylene glycol, decamethylene glycol, trimethylolethane, trimethylolpropane, etc., and alkanedioic acids having from 2 to 12 carbon atoms, e.g., succinic acid, adipic acid, 3-methyladipic acid, pimelic acid, azelaic acid, sebacic acid, decanedioic acid, etc. In preparing the preferred polyesters of higher hydroxyl number the ratio of alkanediol to alkanetriol can be varied, to produce the desired hydroxyl number resin. Polyesters of the preferred type are described, for example, in Hans-Frank Piepenbrink et al. U.S. Patent No. 3,001,973, issued Sept. 26, 1961. They also commercially available under various trade names, for example, such as the Multron series, products of Mobay Chem. Co.

Suitable polyethylene and polypropylene glycols for practicing the invention include those having molecular weights of about from 120 to 6,000 or more; suitable polymeric acrylic and methacrylic alkyl esters include those wherein the alkyl group contains 1–4 carbon atoms, e.g., methyl acrylate, ethyl acrylate, methyl methacrylate, butyl methacrylate, etc., and copolymers thereof with each other and with vinyl monomers, for example, with vinyl alcohol; suitable epoxy resins, and more particularly those prepared from bisphenol A and epichlorohydrin, include those having an epoxide equivalent of about 100–1,000; suitable unreaformladehyde resins include butylated ureaformaldehyde resins. All of the above resins are commercially available under various trade names.

Organic diisocyanates that are suitable cross-linking agents in the process of the invention include those coming within the following formula:

$$OCN-R-NCO$$

wherein R represents a divalent aliphatic, aromatic or alicyclic group such as a divalent alkylene group of 2–10 carbon atoms, e.g., ethylene, trimethylene, 2-popylene, tetramethylene, hexamethylene, decamethylene, etc., a divalent arylene group of 6–10 carbon atoms, e.g., phenylene, tolylene, naphthylene, etc., a divalent alicyclic group of 5–6 carbon atoms, e.g., a divalent cyclopentyl or cyclohexyl group, a xylylene group, and the like. Typical organic diisocyanates include ethylene diisocyanate, trimethylene diisocyanate, tetramethylene diisocyanate, hexamethylene diisocyanate, decamethylene diisocyanate, m-phenylene diisocyanate, naphthylene diisocyanate, diphenyl - 4,4' - diisocyanate, toluene - 2,4 - diisocyanate, toluene - 2,6 - diisocyanate, 4,4'-biphenylene diisocyanate, dianisidine diisocyanate, 1,4 - cyclohexyl diisocyanate, xylylene-1,4-diisocyanate, etc. Adducts of diisocyanates such as above mentioned with trihydric alkanols, e.g., trimethylolmethane, trimethylolethane, trimethylolpropane, trimethylolbutane, glycerol, etc., in the approximate proportions of from 2 to 3 moles of the diisocyanate per mole of the trihydric alcohol, are also especially efficacious cross-linking agents in the process of the invention.

The following examples further illustrate the invention.

Example 1

This example shows the effect on film properties as Tenth-Second Butyrate (TSB—a cellulose acetate butyrate having a viscosity of 0.1 second and a hydroxyl content of 2.8 percent by weight equivalent to a hydroxyl number of 92, manufactured by Eastman Chemical Products, Inc.) and different polyester resins with an increasing hydroxyl number were crosslinked with toluene diisocyanate. A 1:1 ratio of TSB and polyester resin was used based on the hydroxyl content. The tensile strength increased from 1223 p.s.i. with the lowest hydroxyl number polyester resin to 9558 p.s.i. with the highest hydroxyl number polyester resin. The elongation decreased from 316 percent to about 9 percent. The comparative results are set forth in the following table.

TABLE 1

| Ingredients | Sample (parts by wt.) | | | | |
|---|---|---|---|---|---|
| | (a) | (b) | (c) | (d) | (e) |
| Tenth-Second Butyrate (TSB) | 20 | 20 | 20 | 20 | 20 |
| Polyester resin (hydroxyl No. 60) | 30.2 | | | | |
| Polyester resin (hydroxyl No. 167) | | 11.1 | | | |
| Polyester resin (hydroxyl No. 213) | | | 8.7 | | |
| Polyester resin (hydroxyl No. 288) | | | | 6.4 | |
| Polyester resin (hydroxyl No. 394) | | | | | 4.7 |
| Toluene | 32 | 32 | 32 | 32 | 32 |
| Ethyl acetate | 32 | 32 | 32 | 32 | 32 |
| Cellosolve acetate | 16 | 16 | 16 | 16 | 16 |
| | 130.2 | 111.1 | 108.7 | 106.4 | 104.7 |
| Toluene diisocyanate | 6.9 | 6.9 | 6.9 | 6.9 | 6.9 |
| | 137.1 | 118.0 | 115.6 | 113.3 | 111.6 |
| Ratio TSB/polyester (hydroxyl basis) | 1/1 | 1/1 | 1/1 | 1/1 | 1/1 |
| Tensile strength (p.s.i.) | 1,223 | 7,850 | 8,630 | 8,986 | 9,558 |
| Elongation (percent) | 316 | 10 | 9.3 | 13 | 9.7 |

The viscosity of the cellulose acetate butyrate is based on seconds for a 5/16-inch steel ball to fall through 10 inches of a 20% solution in a 90/10 mixture of acetone/denatured alcohol at 25° C. in a 1-inch tube (ASTM D-1343-54T). The polyester resins employed in the above example were the adipic acid/ethylene glycol type modified by appropriate amounts of trimethylolpropane to give the stated hydroxyl numbers.

By substituting similar type of polyester resins with hydroxyl numbers intermediate to those used in the above example, films are obtained with properties intermediate to those shown in above Table 1.

Example 2

This example shows the effect on film properties as cellulose acetate butyrate of 0.1 second viscosity (TSB) and polyester resins of similar type as in Example 1 with an increasing hydroxyl number were crosslinked with an adduct of toluene diisocyanate. The exact composition of the diisocyanate adduct used is not gnown. Generally, the diisocyanate adducts are prepared from a triol such as trimethylol propane or a mixture of a triol and a diol. In any event, the diisocyanate adducts generally have a higher degree of functionality which increases the degree of crosslinking possible. A 1:1 ratio of TSB and polyester resin was used based on the hydroxyl content. The results are listed in following Table 2.

The tensile strength increased from 10,504 p.s.i. to 11,133 p.s.i. as a function of the increased hydroxyl content of the polyester resin. The elongation decreased from 712 percent to 5 percent. By comparing above formulations (a) and (b) with formulations (c) and (e) of Example 1, these results show that higher tensile strengths were obtained by use of an adduct of toluene diisocyanate than with toluene diisocyanate. In fact, these tensile strengths are greater than the tensile strength of cellulose acetate butyrate of 0.5 second viscosity, which is approximately 8,000 p.s.i.

TABLE 2

| Ingredients | Sample (parts by wt.) | |
|---|---|---|
| | (a) | (b) |
| Tenth-Second Butyrate (TSB) | 20 | 20 |
| Polyester resin (hydroxyl No. 213) | 8.7 | |
| Polyester resin (hydroxyl No. 394) | | 4.7 |
| Toluene | 32 | 32 |
| Ethyl acetate | 32 | 32 |
| Cellosolve acetate | 16 | 16 |
| | 108.7 | 104.7 |
| Toluene diisocyanate adduct (Mondur CB-75)* | 25.5 | 25.5 |
| | 134.2 | 130.2 |
| Ratio TSB/polyester (hydroxyl basis) | 1/1 | 1/1 |
| Tensile strength (p.s.i.) | 10,504 | 11,133 |
| Elongation (percent) | 7.2 | 5 |

*Mondur CB-75 is a trade name for a polyisocyanate adduct, a product of Mobay Chem. Co.

Example 3

The following Table 3 illustrates the effect on film properties when a cellulose ester such as cellulose acetate butyrate of 0.1 second viscosity (TSB) and a polyester resin (adipic acid/ethylene glycol type resin modified with trimethylolpropane) were crosslinked with toluene diisocyanate or an adduct of toluene diisocyanate at a ratio other than 1:1 based on the hydroxyl content. A 1.0/0.23 ratio of TSB/polyester resin was used based on the hydroxyl content. A tensile strength of 3848 p.s.i. and an elongation of 149 percent were obtained by using toluene diisocyanate. A tensile strength of 7033 p.s.i. and an elongation of 19 percent were obtained by using an adduct of toluene diisocyanate.

TABLE 3

| Ingredients | Sample (parts by wt.) | |
|---|---|---|
| | (a) | (b) |
| Tenth-Second Butyrate (TSB) | 20 | 20 |
| Polyester resin (hydroxyl No. 45) | 10 | 10 |
| Toluene | 32 | 32 |
| Ethyl acetate | 32 | 32 |
| Cellosolve acetate | 16 | 16 |
| | 110 | 110 |
| Toluene diisocyanate | 4.4 | |
| Toluene diisocyanate adduct (Mondur CB-75) | | 15.8 |
| | 114.4 | 125.8 |
| Ratio TSB/polyester (hydroxyl basis) | 1.0/0.23 | 1.0/0.23 |
| Tensile strength (p.s.i.) | 3,848 | 7,033 |
| Elongation (percent) | 149 | 19 |

Example 4

This example illustrates the effect on film properties when a higher molecular weight cellulose ester such as Half-Second Butyrate (HSB—a cellulose acetate butyrate of 0.5 second viscosity and hydroxyl content of approximately 2 percent by weight) and the polyester of above Example 3 were crosslinked with toluene diisocyanate or an adduct of toluene diisocyanate. A 1.0/0.46 ratio of HSB/polyester resin was used based on the hydroxyl content. The results obtained are shown in Table 4. The film containing toluene diisocyanate had a tensile strength of 3439 p.s.i. and an elongation of 162 percent. The film containing an adduct of toluene diisocyanate had a tensile strength of 5639 p.s.i. and an elongation of 85 percent. The properties of these films may be varied by use of other polyester resins or by increasing or decreasing the content of the polyester resin used.

TABLE 4

| Ingredients | Sample (parts by wt.) | |
|---|---|---|
| | (a) | (b) |
| Half-Second Butyrate (HSB) | 20 | 20 |
| Polyester resin (hydroxyl No. 45) | 10 | 10 |
| Toluene | 32 | 32 |
| Ethyl acetate | 32 | 32 |
| Cellosolve acetate | 16 | 16 |
| | 110 | 110 |
| Toluene diisocyanate | 2.6 | |
| Toluene diisocyanate adduct (Mondur CB-75) | | 9.4 |
| | 112.6 | 119.4 |
| Ratio HSB/polyester (hydroxyl basis) | 1.0/0.46 | 1.0/0.46 |
| Tensile strength (p.s.i.) | 3,439 | 5,639 |
| Elongation (percent) | 162 | 85 |

Example 5

This example shows the effect on film properties as Tenth-Second Butyrate (TSB) and different polyethylene glycol resins with increasing molecular weight were crosslinked with an adduct of toluene diisocyanate. A 1:1 ratio of TSB and polyether resin was used based on the hydroxyl content. The results obtained are set forth in Table 5. The tensile strength decreased from 10,777 p.s.i. with a polyethylene glycol resin of 200 molecular weight to 4,531 with a resin of 1000 molecular weight. The elongation increased from 12 percent to 150 percent as the molecular weight of the polyethylene glycol resin increased from 200 to 1000.

TABLE 5

| Ingredients | Sample (parts by wt.) | | |
|---|---|---|---|
| | (a) | (b) | (c) |
| Tenth-Second Butyrate (TSB) | 20 | 20 | 20 |
| Polyethylene glycol (mol. wt. 200) | 3.3 | | |
| Polyethylene glycol (mol. wt. 300) | | 5.0 | |
| Polyethylene glycol (mol. wt. 1,000) | | | 16.53 |
| Toluene | 32 | 32 | 32 |
| Ethyl acetate | 32 | 32 | 32 |
| Cellosolve acetate | 16 | 16 | 16 |
| | 103.3 | 105.0 | 116.53 |
| Toluene diisocyanate adduct (Mondur CB-75) | 25.6 | 25.6 | 25.6 |
| | 128.9 | 130.6 | 142.13 |
| Ratio TSB/polyethylene glycol (hydroxyl basis) | 1/1 | 1/1 | 1/1 |
| Tensile strength (p.s.i.) | 10,777 | 9,928 | 4,531 |
| Elongation (percent) | 12 | 9 | 150 |

Example 6

The following Table 6 sets forth the effect on film properties as Tenth-Second Butyrate (TSB) and a polyethylene glycol resin of 1000 molecular weight were crosslinked with toluene diisocyanate. A 1.65/1.0 ratio of TSB and polyether resin was used based on the hydroxyl content. A tensile strength of 4,750 p.s.i. and an elongation of 197 percent were obtained.

TABLE 6

| Ingredients: | Parts by wt. |
|---|---|
| Tenth-Second Butyrate (TSB) | 20 |
| Polyethylene glycol (mol. wt. 1000) | 10 |
| Toluene | 32 |
| Ethyl acetate | 32 |
| Cellosolve acetate | 16 |
| | 110 |
| Toluene diisocyanate | 6 |
| | 116 |
| Ratio TSB/polyether (hydroxyl basis) | 1.65/1.0 |
| Tensile strength (p.s.i.) | 4,750 |
| Elongation (percent) | 197 | lecular weight. The elongation increased from 11 percent to 76 percent as the molecular weight of the polypropylene glycol resin increased from 150 to 1200.

TABLE 7

| Ingredients | Sample (parts by wt.) | | |
|---|---|---|---|
| | (a) | (b) | (c) |
| Tenth-Second Butyrate (TSB) | 20 | 20 | 20 |
| Polypropylene glycol (mol. wt. 150) | 2.47 | | |
| Polypropylene glycol (mol. wt. 425) | | 7.02 | |
| Polypropylene glycol (mol. wt. 1,200) | | | 20 |
| Toluene | 32 | 32 | 32 |
| Ethyl acetate | 32 | 32 | 32 |
| Cellosolve acetate | 16 | 16 | 16 |
| | 102.47 | 107.02 | 120 |
| Toluene diisocyanate adduct (Mondur CB-75) | 25.6 | 25.6 | 25.6 |
| | 128.07 | 132.62 | 145.6 |
| Ratio TSB/polypropylene glycol (hydroxyl basis) | 1/1 | 1/1 | 1/1 |
| Tensile strength (p.s.i.) | 11,887 | 10,532 | 4,592 |
| Elongation (percent) | 11 | 13.4 | 76 |

Example 8

In this example, the effect on film properties is shown in Table 8 as cellulose acetate propionate (a hydroxyl-group-containing cellulose acetate propionate of 0.3 second viscosity) and polyester resins of adipic acid and ethylene glycol, modified trimethylolpropane, type with an increasing hydroxyl number were crosslinked with toluene diisocyanate or an adduct of toluene diisocyanate at a ratio of 1:1 based on the hydroxyl content. The NCO/OH ratio was maintained at 1.2:1.0 in all the samples of crosslinking. The tensile strength increased from 1,816 p.s.i. with the lower hydroxyl number polyester resin to 7450 p.s.i. with the higher hydroxyl number polyester resin. The elongation decreased from 187 percent to 5.8 percent using toluene diisocyanate as the cross-linking agent. For the films prepared with the adduct of toluene diisocyanate, the increase in tensile strength was from 5,323 for the lower hydroxyl number polyester resin to 10,910 for the higher hydroxyl number polyester film, while the decrease in elongation was from 119 percent to 4.1 percent, respectively. Film sample (e) comprising EAP cellulose acetate propionate alone showed relatively poor solvent resistance and the lowest elongation.

TABLE 8

| Ingredients | Sample (parts by wt.) | | | | |
|---|---|---|---|---|---|
| | (a) | (b) | (c) | (d) | (e) |
| Cellulose acetate propionate | 16.9 | 14.6 | 13.5 | 12.0 | 20 |
| Cellosolve acetate | 13.5 | 11.8 | 10.7 | 9.6 | 18 |
| Ethyl acetate | 27.1 | 23.4 | 21.5 | 19.1 | 32 |
| Toluene | 27.1 | 23.4 | 21.5 | 19.1 | 32 |
| Polyester resin (hydroxyl No. 165) | 9.4 | 8.1 | | | |
| Polyester resin (hydroxyl No. 45) | | | 28.2 | 25.1 | |
| Toluene diisocyanate | 6.0 | | 4.6 | | |
| Toluene diisocyanate adduct (Mondur CB-75) | | 18.7 | | 15.1 | |
| | 100.0 | 100.0 | 100.0 | 100.0 | 100 |
| Ratio EAP cellulose acetate propionate/polyester (hydroxyl basis) | 1/1 | 1/1 | 1/1 | 1/1 | |
| NCO/OH ratio | 1.2/1.0 | 1.2/1.0 | 1.2/1.0 | 1.2/1.0 | |
| Compatibility | C | C | C | C | |
| Acetone Resistance | Excellent | Excellent | Excellent | Excellent | Poor |
| Tensile strength, p.s.i. | 7,450 | 10,910 | 1,816 | 5,323 | 4,950 |
| Elongation, percent | 5.8 | 4.1 | 187 | 119 | 2.9 |

Example 7

In this example, the effect on film properties is shown in Table 7 as Tenth-Second Butyrate (TSB) and polypropylene glycol resins with increasing molecular weight were crosslinked with an adduct of toluene diisocyanate. A 1:1 ratio of TSB and polyether resin was used based on the hydroxyl content. The tensile strength decreased from 11,887 p.s.i. with a polypropylene glycol resin of 150 molecular weight to 4,592 p.s.i. with a resin of 1200 mo- Example 9

In this example, different ratios of cellulose acetate (E-398-3, a hydroxyl group containing cellulose acetate of 3 seconds viscosity, manufactured by Eastman Chemical Products, Inc.) and a polyetser resin of adipic acid and ethylene glycol type modified with trimethylolpropane and having a hydroxyl number of 45 were crosslinked with toluene diisocyanate or an adduct of toluene diisocyanate at an NCO/OH ratio of 1.2/1.0 in each case.

Referring to Table 9, it will be seen that the tensile strength of the films produced with toluene diisocyanate increased from 525 p.s.i. for a 1/1 ratio E-398-3/polyester to 6,600 p.s.i. for a 4/1 ratio, and that the elongation decreased from 37.2 percent to 10.9 percent, respectively. All of these samples showed good to excellent solvent resistance. In contrast, the film produced from control sample (d_ showed poor solvent resistance.

TABLE 9

| Ingredients | Sample (parts by wt.) | | | |
|---|---|---|---|---|
| | (a) | (b) | (c) | (d) |
| Cellulose acetate (E-398-3) | 7.8 | 8.7 | 9.2 | 10 |
| Ethyl acetate | 28.0 | 31.2 | 33.1 | 36 |
| Cellosolve acetate | 14.0 | 15.6 | 16.6 | 18 |
| Methyl ethyl ketone | 28.0 | 31.2 | 33.1 | 36 |
| Polyester resin (hydroxyl No. 45) | 19.2 | 10.7 | 5.7 | |
| Toluene diisocyanate | 3.0 | 2.6 | 2.3 | |
| Toluene diisocyanate adduct | | | | |
| | 100.0 | 100.0 | 100.0 | 100 |
| Ratio E-398-3/polyester (hydroxyl basis) | 1/1 | 2/1 | 4/1 | |
| NCO/OH ratio | 1.2/1.0 | 1.2/1.0 | 1.2/1.0 | |
| Compatibility | Sl. haze | Sl. haze | Sl. haze | |
| Acetone resistance | Good | Excellent | Excellent | Poor |
| Tensile strength, p.s.i. | 525 | 3,160 | 6,600 | 8,780 |
| Elongation, percent | 37.2 | 18.5 | 10.9 | 4.9 |

The following Examples 10, 11 and 12 are formulations containing an epoxy, ureaformaldehyde, and an acrylic type resin, respectively. Crosslinked films prepared with Tenth-Second Butyrate (TSB) and these type resins were acetone insoluble. However, the films were too brittle for tensile strength and elongation determination. However, it will be understood that by the selection of a suitable cellulose derivative other than TSB or other types of an epoxy, ureaformaldehyde, or acrylic resin would produce different results. Also, a flexible polyester or polyether type compound can be crosslinked into these type systems to improve film flexibility. The addition of a plasticizer without crosslinking sites may also be used, if desired.

Example 10

TABLE 10

| Ingredients: | Parts by wt. |
|---|---|
| Tenth-Second Butyrate (TSB) | 20 |
| Epoxy resin (Epon 1001)[1] | 5 |
| Toluene | 32 |
| Ethyl acetate | 32 |
| Cellosolve acetate | 16 |
| | 105 |
| Toluene diisocyanate | 5 |
| | 110 |

[1] Epon 1001 is the trade name for a bisphenol A epoxy resin, a product of Shell Chem. Corp.

The film obtained was too brittle to obtain tensile and elongation data.

Example 11

TABLE 11

| Ingredients: | Parts by wt. |
|---|---|
| Tenth-Second Butyrate (TSB) | 20 |
| Ureaformaldehyde resin (60% solution of Uformite F-240)[1] | 16.7 |
| Toluene | 40 |
| Ethyl acetate | 40 |
| | 116.7 |
| Toluene diisocyanate | 6 |
| | 122.7 |

[1] Uformite F-240 is a butylated ureaformaldehyde resin, a product of Rohm and Haas Co.

The film obtained was too brittle to obtain tensile and elongation data.

Example 12

TABLE 12

| Ingredients: | Parts by wt. |
|---|---|
| Tenth-Second Butyrate (TSB) | 20 |
| Acrylic resin (2% carboxyl) (40%) (Lucite 6012)[1] | 50 |
| Toluene | 32 |
| Ethyl acetate | 32 |
| Cellosolve acetate | 16 |
| | 150 |
| Toluene diisocyanate adduct (Mondur CB-75) | 17.8 |
| | 167.8 |

[1] Lucite 6012 is the trade name of an alkyl ester of methacrylic acid, a product of E. I. Du Pont de Nemours & Co.

The films obtained were too brittle to obtain tensile and elongation data.

An NCO/OH ratio of 1.2/1.0 was used for all formulations. This is the normal ratio used but an NCO/OH ratio of 2/1 could be used. All of the films were cured 30 minutes at 350° F. Some film discoloration was obtained, especially with the polyether materials. However, a lower cure temperature and heat stabilizers reduce film discoloration. The addition of an amine catalyst such as triethyl amine produced air-cured films with excellent hardness and solvent resistance.

Example 13

This example illustrates the use of a composition of the invention comprising a cellulose acetate butyrate (TSB) of 0.1 second viscosity and hydroxyl content of 2.8 percent, a linear saturated polyester having a hydroxyl number of 40-45, an epoxide resin and an adduct of a polyisocyanate as a coating material or lacquer for rubber based products such as automobile tires, wading boots, etc. The purpose of the coating in cured condition is to enhance the appearance of the product by covering surface imperfections and to protect the article during use with a continuous tough, flexible and solvent resistant coating. The coating may also be applied on the inside of pressurized rubber articles such as tubeless tires to reduce the rate of air loss. The use of epoxy resin results in a reduction of the cure temperature and also improves the adhesion to rubber surfaces. The physical properties of films produced with a number of formulations are set forth in the following table.

TABLE 13

| Ingredients | Sample (parts by wt.) | | |
|---|---|---|---|
| | (a) | (b) | (c) |
| Tenth-Second Butyrate (dry) (TSB) | 8.1 | 8.1 | 8.1 |
| Multron R-16 [1] | 26.2 | 20.0 | 23.0 |
| Epon 1001 (50%) | | 12.4 | 6.2 |
| Solvent | 52.3 | 44.0 | 48.3 |
| | 86.6 | 84.5 | 85.6 |
| Mondur CB-75 | 13.4 | 15.5 | 14.4 |
| | 100.0 | 100.0 | 100.0 |
| Time at 225-250° F | 30 min. | 30 min. | 30 min. |
| Adhesion to rubber stock | Poor | Excellent | Good |
| Acetone resistance | Poor | Good | Good |

[1] Multron R-16 is the trade name of a polyester having a hydroxyl number of about 45, a product of Mobay Chem. Co.

Films prepared by above formulations (a) and (c) were clear on air-drying. Films prepared by formulation (b) were moderately hazy on air-drying but were clear after curing for 30 minutes at 225° F. This would indicate that the epoxy resin entered into the cross-linking mechanism. It will be seen further that the film prepared by formulation (a) with no epoxy resin showed poor adhesion to rubber stock, whereas films prepared by formulations (b) and (c) showed good and excellent adhesion results, respectively. Also of note is that formulation (a) did not cure at 225-250° F. and was later cured at a temperature of 325° F.

Example 14

A high degree of gloss was obtained from the lacquer compositions of Example 13. This is undesirable for some applications. This example sets forth formulations and properties obtained for both glossy and flat finishes for rubber products in the following table.

TABLE 14

| Ingredients | Sample (parts by wt.) | |
|---|---|---|
| | (a) | (b) |
| Tenth-Second Butyrate (dry) (STB) | 4.0 | 4.0 |
| Toluene | 6.5 | 6.5 |
| Ethyl acetate | 32.3 | 29.8 |
| Methyl isobutyl ketone | 20.0 | 20.0 |
| Cellosolve acetate | 13.2 | 13.2 |
| Multron R-16 (100%) | 10.0 | |
| Multron R-16 (80%+20% Syloid)[1] | | 12.5 |
| Epon 1001 [2] (50% in Cell. acetate 98%) | 6.2 | 6.2 |
| | 92.2 | 92.2 |
| Mondur CB-75 | 7.8 | 7.8 |
| | 100.0 | 100.0 |
| Ratio NCO/OH | 1.2/1.0 | 1.2/1.0 |
| Nonvolatile (percent) | 22.9 | 25.4 |
| Viscosity, centipoises | 15-20 | 15-20 |
| Cure time at 225-250° F | 30 min. | 30 min. |
| Adhesion to rubber stock | Excellent | Excellent |
| Flexibility | Good | Good |
| General appearance of coating | Glossy | Flat |

[1] Syloid 978 (a synthetic silica used as a flattening agent manufactured by Davison Chem. Co.) dispersed in Multron R-16.
[2] Bisphenol A epoxy resin.

By reference to the above Table 14, it will be seen that both the glossy and the flat coatings showed excellent adhesion to rubber stock and had good flexibility.

In place of the Syloid in the above example, there can be substituted other types of pigment such as carbon black, titanium dioxide, and the like. Also, other cellulose esters with functional groups for cross-linking, such as hydroxyl groups, may be used in place of the cellulose acetate butyrate, for example, cellulose acetate, cellulose acetate propionate, etc. In place of the polyester resin, there can be substituted in the above example any other of the previously mentioned linear saturated polyesters having a hydroxyl number of about from 30 to 150. For the epoxy resin, there can be substituted in the above example, any saturated epoxy resin having an epoxide equivalent of about from 125 to 600. The coatings produced from these latter substituted materials likewise have excellent adhesion to rubber stock and good flexibility.

Example 15

This example illustrates two compositions of the invention that are particularly useful as coating lacquers for leather that is to be used in the manufacture of shoes, handbags, belts and other wearing apparel and accessories. A specific example is the use of these coatings, for example, to provide so-called "patent" leather materials. Further utility of these coatings are in the field of cloth coatings and artificial leather. The coatings from the compositions of this example are characterized by deep gloss and scuff resistance with no tendency to crack or break. The following Tables 15 and 16 list the ingredients of these compositions.

TABLE 15

Part A'

| Ingredients: | Parts by wt. |
|---|---|
| Tenth-Second Butyrate (TSB) | 6.75 |
| Polyester resin (Multron R-16) | 20.0 |
| Carbon black | 0.75 |
| Toluene | 23.0 |
| Ethyl acetate | 22.8 |
| Ethylene glycol mono ethyl ether acetate | 12.5 |
| | 85.8 |

Part B

| | |
|---|---|
| Diisocyanate adduct (Mondur CB-75) | 14.2 |

[1] Part A and Part B must be thoroughly mixed prior to application. After the addition of Part B to Part A the stability of the coating is limited to 2-4 days depending on the ambient temperature.

The above formulation has been successfully used as a coating for leather. This particular composition gives a tough, durable coating having a rich deep gloss. The pigment may be omitted, if desired, from the composition and the resulting composition used as a clear topcoat over the pigmented coating to enhance its gloss and attractiveness.

TABLE 16

Part A'

| Ingredients: | Parts by wt. |
|---|---|
| Tenth-Second Butyrate (TSB) | 10 |
| Polyester resin Multron R-18 [2] | 30 |
| Toluene | 24 |
| Ethyl acetate | 15 |
| Ethylene glycol monoethyl ether acetate (99%) | 15 |
| | 94 |

Part B

| | |
|---|---|
| Toluene diisocyanate | 6 |
| | 6 |

[1] Add Part B to Part A just prior to use. After this addition the stability is approximately 1 day depending on the temperature.
[2] Multron R-18 is the trade name of a polyester having a hydroxyl number of about 60, a product of Mobay Chem. Co.

The properties of the coatings obtained with the above formulation of Table 16 are generally similar to those obtained with the formulation of Table 15. However, the coating of Table 16 cures more rapidly but has shorter package stability.

In place of the 0.1 second cellulose acetate butyrate in above formulations of Tables 15 and 16, there can be substituted any other hydroxyl group containing cellulose acetate butyrates having viscosities in the range of 0.05-40 seconds. The amount of cellulose acetate butyrate in these compositions can range about from 10 to 65%. Cellulose acetate, cellulose acetate propionate, cellulose ethers, cellulose nitrate or combinations of these may also be used in place of the cellulose acetate butyrate. Also, in place of the polyester resins, there can be substituted in the above formulations any other of the previously mentioned linear saturated polyesters having a hydroxyl number of about from 30 to 150. The toluenes diisocyanate and the aduct thereof can also be substituted with any other of the previously mentioned organic diisocyanates. The coatings produced with the substituted formulations have generally similar properties as those produced with the formulations of Tables 15 and 16.

The coating compositions set forth in the above examples of the invention can also contain modifying agents such as dyes, pigments, fillers, inhibitors, dispersing agents, plasticizers, and the like. Such coating compositions may be prepared by dispersing pigments, which are made for use in organic coating compositions, in either the cellulose acetate butyrate or polyester resin by means of conventional paint grinding equipment, such as ball or pebble mill, roller mills, or Banbury mixers. Suitable solvents and diluents may be incorporated before, during, or after the milling operations. These coatings can be applied with the conventional coating equipment such as spray, roller coater, brush, gravure coater, etc.

In some applications, it has been found advantageous to apply the coating compositions of the invention onto primed surfaces. For example, coatings on leather have deeper gloss and improved build when a primer is used. Standard leather primers function satisfactory under the coatings. Acrylic primers such as Primal EM and Primal AC-33 both products of Rohm and Haas Company give excellent results. The exact composition of these primers is not known, but they are water emulsions of an acrylic polymer prepared from one or more of the monomers such as methyl acrylate, ethyl acrylate, butyl acrylate, methyl methacrylate, ethyl methacrylate, butyl methacrylate, acrylic acid, methacrylic acid, etc. Other primers which may also be used for this purpose include, for example, polyvinyl ester primers.

By appropriate selection of the cellulose derivative, the synthetic resin and the organic diisocyanate from any of those previously mentioned as suitable for practicing the invention, other cross-linked polymers, films, coatings, etc. can be prepared in accordance with the formulations set forth in the preceding examples.

The invention has been described in detail with particular reference to preferred embodiments thereof, but it will be understood that variations and modifications can be effected within the spirit and scope of the invention as described hereinabove and as defined in the appended claims.

We claim:

1. A process for preparing a solvent resistant cross-linked polymer consisting essentially of reacting at 75–250° C. a mixture comprising (a) from 15 to 90% by weight of an ester of cellulose with at least one alkanoic acid said ester containing from 0.05 to 10% by weight of hydroxyl groups, (b) from 85–10% by weight of a linear saturated synthetic polymer selected from the group consisting of a polyester having a hydroxyl number of from 10 to 500, a polyethylene glycol having a molecular weight of 120–6000, a polypropylene glycol having a molecular weight of 120–6000, an epoxy resin having an epoxide equivalent of 100–1000, a polyalkyl acrylate wherein said alkyl group contains 1–4 carbons and having at least 2% carboxyl content, a polyalkyl methacrylate wherein said alkyl group contains 1–4 carbon atoms and having at least 2% carboxyl content and a butylated urea-formaldehyde resin, and (c) an organic isocyanate selected from the group consisting of (1) diisocyanates represented by the following formula:

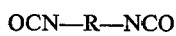

wherein R represents a member selected from the group consisting of a divalent alkylene group of 2–10 carbon atoms, a divalent arylene group of 6–10 carbon atoms, a divalent alicyclic group of 5–6 carbon atoms and a xylylene group, and (2) an adduct of said organic diisocyanate with a trihydric alkanol selected from the group consisting of glycerol, trimethylolmethane, trimethylolethane, trimethylolpropane, trimethylolbutane, in the ratio of 2–3 moles of said organic diisocyanate to each mole of said trihydric alkanol, and wherein said organic diisocyanate being present in at least a stoichiometrically calculated amount to react with all of the active hydrogen of said (a) and (b) components.

2. The process of claim 1 wherein said ester of cellulose is a cellulose acetate butyrate, wherein said synthetic polymer is a polyester of an alkanediol of 2–10 carbon atoms and an alkanedioic acid of 2–12 carbon atoms, and wherein said organic diisocyanate is a polymethylene diisocyanate wherein said polymethylene group contains 2–10 carbon atoms.

3. The process of claim 1 wherein said ester of cellulose is a cellulose acetate, wherein said synthetic polymer is a polyester of an alkanediol of 2–10 carbon atoms and an alkanedioic acid of 2–12 carbon atoms, and wherein said organic diisocyanate is a polymethylene diisocyanate wherein said polymethylene group contains 2–10 carbon atoms.

4. The process of claim 2 wherein said ester of cellulose is a cellulose acetate propionate, wherein said synthetic polymer is a polyester of an alkanediol of 2–10 carbon atoms and an alkanedioic acid of 2–12 carbon atoms, and wherein said organic diisocyanate is a polymethylene diisocyanate wherein said polymethylene group contains 2–10 carbon atoms.

5. The process of claim 1 wherein said ester of cellulose is a cellulose acetate butyrate, wherein said synthetic resin is a polyethylene glycol, and wherein said organic diisocyanate is a polymethylene diisocyanate wherein said polymethylene group contains 2–10 carbon atoms.

6. The process of claim 1 wherein said ester of cellulose is a cellulose acetate butyrate, wherein said synthetic resin is a polypropylene glycol, and wherein said organic diisocyanate is a polymethylene diisocyanate wherein said polymethylene group contains 2–10 carbon atoms.

7. A coating composition consisting essentially of (a) from 15 to 90% by weight of an ester of cellulose with at least one alkanoic acid said ester containing from 0.05 to 10% by weight of hydroxyl groups, (b) from 85–10% by weight of a linear saturated synthetic polymer selected from the group consisting of a polyester having a hydroxyl number of from 10 to 500, a polyethylene glycol having a molecular weight of 120–6000, a polypropylene glycol having a molecular weight of 120–6000, an epoxy resin having an epoxide equivalent of 100–1000, a polyalkyl acrylate wherein said alkyl group contains 1–4 carbons and having at least 2% carboxyl content, a polyalkyl methacrylate wherein said alkyl group contains 1–4 carbon atoms and having at least 2% carboxyl content and a butylated ureaformaldehyde resin, and (c) an organic isocyanate selected from the group consisting of (1) diisocyanates represented by the following formula:

wherein R represents a member selected from the group consisting of a divalent alkylene group of 2–10 carbon atoms, a divalent arylene group of 6–10 carbon atoms, a divalent alicyclic group of 5–6 carbon atoms and a xylylene group, and (2) an adduct of said organic diisocyanate with a trihydric alkanol selected from the group consisting of glycerol, trimethylolmethane, trimethylolethane, trimethylolpropane, trimethylolbutane, in the ratio of 2–3 moles of said organic diisocyanate to each mole of said trihydric alkanol, and wherein said organic diisocyanate being present in at least a stoichiometrically calculated amount to react with all of the active hydrogen of said (a) and (b) components.

References Cited

UNITED STATES PATENTS

| | | | |
|---|---|---|---|
| 3,386,931 | 7/1968 | Smart et al. | |
| 3,386,932 | 7/1968 | Steinman et al. | |
| 2,729,618 | 1/1956 | Müller et al. | 260—75 |
| 2,981,712 | 4/1961 | Harper | 260—32.8 |
| 3,213,046 | 10/1965 | Harrington et al. | 260—13 |
| 3,362,921 | 1/1968 | Ehrlich et al. | 260—18 |

WILLIAM H. SHORT, Primary Examiner

E. NIELSEN, Assistant Examiner

U.S. Cl. X.R.

260—15, 16, 17